United States Patent
Park et al.

(10) Patent No.: US 11,585,732 B2
(45) Date of Patent: Feb. 21, 2023

(54) APPARATUS AND METHOD FOR DIAGNOSING FAILURE OF PLANT

(71) Applicant: DOOSAN ENERBILITY CO., LTD, Changwon-si (KR)

(72) Inventors: Jee Hun Park, Gwangmyeong (KR); Hyun Sik Kim, Gimpo (KR); Sang Gun Na, Yongin (KR); Jun Woo Yoo, Seoul (KR)

(73) Assignee: DOOSAN ENERBNITY CO., LTD., Changwon (KR)

( * ) Notice: Subject to any disclaimer, the term of this patent is extended or adjusted under 35 U.S.C. 154(b) by 48 days.

(21) Appl. No.: 17/133,145

(22) Filed: Dec. 23, 2020

(65) Prior Publication Data

US 2021/0208030 A1 Jul. 8, 2021

(30) Foreign Application Priority Data

Jan. 2, 2020 (KR) .................. 10-2020-0000533

(51) Int. Cl.
*G01M 99/00* (2011.01)
*G06N 7/00* (2023.01)

(52) U.S. Cl.
CPC ............ *G01M 99/00* (2013.01); *G06N 7/005* (2013.01)

(58) Field of Classification Search
CPC ............ G06N 5/02; G06N 5/022; G06N 5/04; G06N 5/041; G06Q 10/04; G06Q 10/06; G06Q 10/063; G06Q 50/04; G06Q 50/06; G05B 23/02; G05B 23/0205; G05B 23/0218; G05B 23/0243; G05B 23/0221; G05B 23/0275; G05B 23/0283; G05B 23/027; G05B 23/0272
See application file for complete search history.

(56) References Cited

U.S. PATENT DOCUMENTS

| | | | | |
|---|---|---|---|---|
| 4,755,925 | A * | 7/1988 | Tsuchiya | G05B 23/0254 700/36 |
| 8,370,045 | B2 | 2/2013 | Qin et al. | |
| 11,092,952 | B2 * | 8/2021 | Park | G05B 23/0281 |
| 2013/0073260 | A1 | 3/2013 | Maeda et al. | |

(Continued)

FOREIGN PATENT DOCUMENTS

KR 1019980036844 A 8/1998
KR 101065767 B1 4/2010

(Continued)

OTHER PUBLICATIONS

KR OA dated May 31, 2021.

*Primary Examiner* — Son T Le
*Assistant Examiner* — Matthew W. Baca
(74) *Attorney, Agent, or Firm* — Harvest IP Law LLP

(57) ABSTRACT

An apparatus for diagnosing failure of a plant is provided. The apparatus for diagnosing failure of a plant includes: a data analyzer configured to provide data analysis information, which is information requiring analysis to diagnose failure of the plant, and a comprehensive diagnostic device configured to diagnose the failure using each of an algorithm-based diagnosing technique and a domain knowledge-based diagnosing technique based on the data analysis information, and to derive comprehensive diagnosis information for the failure by summarizing results of the algorithm-based diagnosing technique and the domain knowledge-based diagnosing technique.

19 Claims, 5 Drawing Sheets

(56) References Cited

U.S. PATENT DOCUMENTS

| | | | | |
|---|---|---|---|---|
| 2013/0179129 A1* | 7/2013 | Patankar | ............. | G06F 11/0739 |
| | | | | 703/2 |
| 2013/0218522 A1* | 8/2013 | Suzuki | .................... | G06F 11/30 |
| | | | | 702/183 |
| 2015/0346066 A1* | 12/2015 | Dutta | ................. | G05B 23/0221 |
| | | | | 702/183 |
| 2018/0129196 A1* | 5/2018 | Hainz | ................. | G05B 23/0275 |
| 2019/0086294 A1 | 3/2019 | Kubo et al. | | |
| 2021/0397176 A1* | 12/2021 | Min | ........................ | H02J 3/004 |

FOREIGN PATENT DOCUMENTS

| | | | |
|---|---|---|---|
| KR | 1020110118023 | A | 10/2011 |
| KR | 101351309 | B1 | 10/2013 |
| KR | 1020130112968 | A | 10/2013 |
| KR | 101843365 | B1 | 6/2016 |
| KR | 1020170125237 | A | 11/2017 |

\* cited by examiner

APPARATUS AND METHOD FOR DIAGNOSING FAILURE OF PLANT

CROSS-REFERENCE TO RELATED APPLICATION

This application claims priority to Korean Patent Application No. 10-2020-0000533, filed on Jan. 2, 2020, the disclosure of which is incorporated by reference herein in its entirety.

BACKGROUND

Field

Apparatuses and methods consistent with exemplary embodiments relate to a failure diagnosis technology, and more particularly, to an apparatus and a method for diagnosing failure of a plant.

Description of the Related Art

In general, a related art plant failure diagnosis is performed based on a domain-knowledge. However, an accurate diagnosis logic design is significantly difficult due to a complexity of the plant, an absence of the expertise and experts, a failure case, and lack of related data. For this reason, accurate failure diagnosis is not performed, resulting in significant economic loss. Therefore, it is necessary to develop a new method capable of solving the problems, that is, a method of performing more accurate diagnosis.

SUMMARY

Aspects of one or more exemplary embodiments provide an apparatus and a method for diagnosing failure of a plant.

Additional aspects will be set forth in part in the description which follows and, in part, will become apparent from the description, or may be learned by practice of the exemplary embodiments.

According to an aspect of an exemplary embodiment, there is provided an apparatus for diagnosing failure of a plant including: a data analyzer configured to provide data analysis information, which is information requiring analysis to diagnose failure of the plant, and a comprehensive diagnostic device configured to diagnose the failure using each of an algorithm-based diagnosing technique and a domain knowledge-based diagnosing technique based on the data analysis information, and to derive comprehensive diagnosis information for the failure by summarizing results of the algorithm-based diagnosing technique and the domain knowledge-based diagnosing technique.

The comprehensive diagnostic device may include: an algorithm-based diagnostic device configured to derive algorithm-based diagnosis information by performing the diagnosis using the algorithm-based diagnosing technique based on the data analysis information, and a domain knowledge-based diagnostic device configured to derive domain knowledge-based diagnosis information by performing the diagnosis using the domain knowledge-based diagnosing technique based on the data analysis information.

The comprehensive diagnostic device may further include: a diagnosis determiner configured to derive comprehensive diagnosis information by summarizing the algorithm-based diagnosis information derived from the algorithm-based diagnostic device and the domain knowledge-based diagnosis information derived from the domain knowledge-based diagnostic device.

The apparatus may further include: a diagnosis analyzer configured to generate algorithm improvement information by analyzing the algorithm-based diagnosis information and the domain knowledge-based diagnosis information, and to feedback the generated algorithm improvement information to the comprehensive diagnostic device.

The algorithm improvement information may include: a tuning value of a parameter of a diagnosing algorithm for improving the diagnosing algorithm of the algorithm-based diagnostic device, and a tuning value of a base knowledge and case determination reference parameter for improving a base knowledge and case determination reference of the domain knowledge-based diagnostic device.

In response to receiving, as feedback, the algorithm improvement information including the tuning value of the parameter of the diagnosing algorithm from the diagnosis diagnostic device, the algorithm-based diagnostic device may tune the parameter of the diagnosing algorithm, and derive the algorithm-based diagnosis information through the tuned diagnosing algorithm.

In response to receiving, as feedback, the algorithm improvement information including the tuning value of the base knowledge and case determination reference parameter from the diagnosis analyzer, the domain knowledge-based diagnostic device may tune the base knowledge and case determination reference parameter, and determine whether the data analysis information is matched with one of a plurality of base knowledge and a plurality of cases according to the tuned determination reference parameter to derive the domain knowledge-based diagnosis information.

The data analyzer may further include: a data generator configured to collect basic data which are basis of the data analysis information, and an information analyzer configured to analyze the basic data to generate the data analysis information.

The data analysis information may include: trend information representing trends and change amounts of a control value for the plant, a forecasted value obtained by forecasting the output of the plant by the control value for the plant, a measured value obtained by measuring the output of the plant operated by the control value for the plant and a residual which is a difference between the measured value and the forecasted value, early warning analysis information representing whether an early warning occurs, a time point, a frequency, a location, and a warning level for the failure of the plant, and correlation analysis information which analyzes a correlation between the early warning and the diagnosis.

The comprehensive diagnostic device may diagnose signal integrity representing whether the failure occurs due to an abnormality of a sensor or an actual failure, a failure time point representing a time point at which the failure occurs, a failure location representing a location at which the failure occurs, a warning level representing the level of the failure, and a failure cause representing the reason why the failure occurs, and output the comprehensive diagnosis information which is a result according to the diagnosis.

According to an aspect of another exemplary embodiment, there is provided a method for diagnosing failure of a plant including: providing, by a data analyzer, data analysis information which is information requiring analysis to diagnose failure of the plant, and diagnosing, by a comprehensive diagnostic device, the failure using each of an algorithm-based diagnosing technique and a domain knowledge-based diagnosing technique based on the data analysis information, and deriving comprehensive diagnosis information for the failure by summarizing results of the algorithm-based diagnosing technique and the domain knowledge-based diagnosing technique.

The deriving of the comprehensive diagnosis information may include: deriving, by an algorithm-based diagnostic device of the comprehensive diagnostic device, algorithm-based diagnosis information by performing diagnosis using the algorithm-based diagnosing technique based on the data analysis information, and deriving, by a domain knowledge-based diagnostic device of the comprehensive diagnostic device, domain knowledge-based diagnosis information by performing the diagnosis using the domain knowledge-based diagnosing technique based on the data analysis information.

In response to receiving, as feedback, algorithm improvement information including a tuning value of a parameter of a diagnosing algorithm from a diagnosis analyzer, the deriving of the algorithm-based diagnosis information may include tuning the parameter of the diagnosing algorithm, and deriving the algorithm-based diagnosis information through the tuned diagnosing algorithm, by the algorithm-based diagnostic device.

In response to receiving, as feedback, algorithm improvement information including a tuning value of a base knowledge and case determination reference parameter from a diagnosis analyzer, the deriving of the algorithm-based diagnosis information may include tuning a base knowledge and case determination reference parameter, and determining whether the data analysis information is matched with one of a plurality of base knowledge and a plurality of cases according to the tuned determination reference parameter to derive domain knowledge-based diagnosis information by the domain knowledge-based diagnostic device.

The deriving of the comprehensive diagnosis information may further include: deriving, by a diagnosis determiner of the comprehensive diagnostic device, the comprehensive diagnosis information for the failure by summarizing the algorithm-based diagnosis information derived from the algorithm-based diagnostic device and the domain knowledge-based diagnosis information derived from the domain knowledge-based diagnostic device.

The comprehensive diagnosis information may include: signal integrity representing whether the failure occurs due to an abnormality of a sensor or an actual failure, a failure time point representing a time point at which the failure occurs, a failure location representing a location at which the failure occurs, a warning level representing a level of the failure, and a failure cause representing a reason why the failure occurs.

After the deriving of the domain knowledge-based diagnosis information, the method may further include: generating, by a diagnosis analyzer, algorithm improvement information by analyzing the algorithm-based diagnosis information and the domain knowledge-based diagnosis information, and feedbacking the generated algorithm improvement information to the comprehensive diagnostic device.

The algorithm improvement information may include: a tuning value of a parameter of a diagnosing algorithm for improving the diagnosing algorithm of the algorithm-based diagnostic device, and a tuning value of a base knowledge and case determination reference parameter for improving a base knowledge and case determination reference of the domain knowledge-based diagnostic device.

The providing of the data analysis information may include: collecting, by a data generator of the data analyzer, basic data which are basis of the data analysis information, and generating, by an information analyzer of the data analyzer, the data analysis information by analyzing the basic data.

The data analysis information may include: trend information representing trends and change amounts of a control value for the plant, a forecasted value obtained by forecasting the output of the plant by the control value for the plant, a measured value obtained by measuring the output of the plant operated by the control value for the plant and a residual which is a difference between the measured value and the forecasted value, early warning analysis information representing whether an early warning occurs, a time point, a frequency, a location, and a warning level for the failure of the plant, and correlation analysis information which analyzes a correlation between the early warning and the diagnosis.

According to one or more exemplary embodiments, it is possible to perform the diagnosis using both algorithm-based diagnosis and domain knowledge-based diagnosis, thereby enabling more accurate diagnosis even in the case in which the expertise and the failure cases of the corresponding device or the related data are insufficient.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
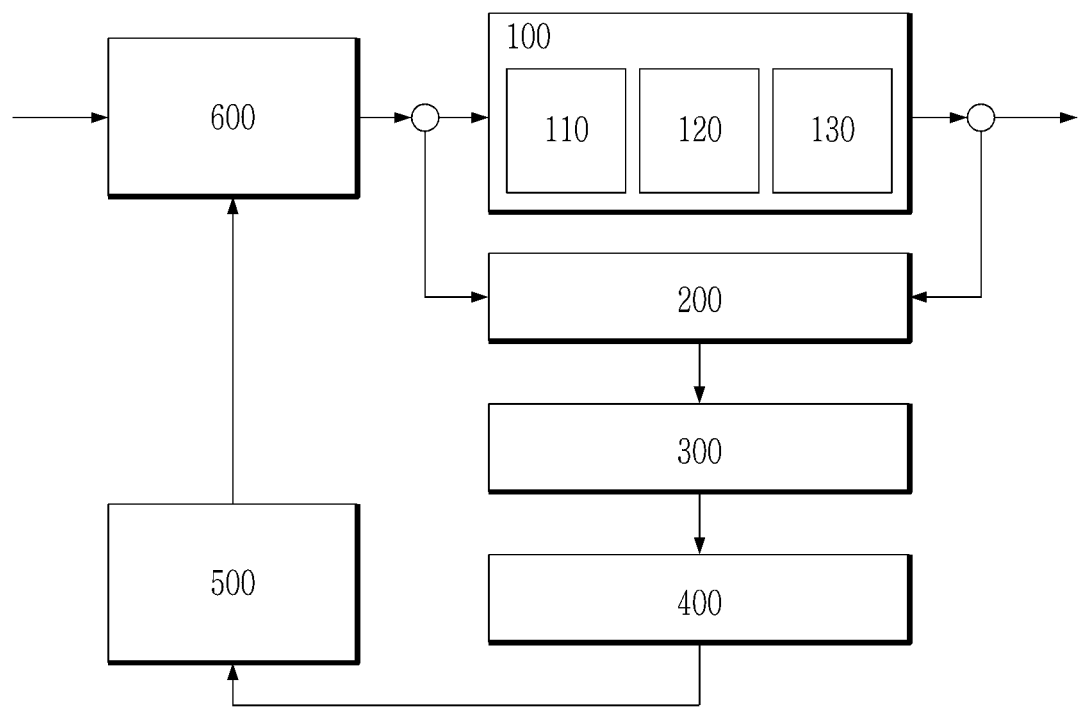
FIG. 1 is a block diagram for explaining a configuration of a plant system according to an exemplary embodiment.

Various changes and various exemplary embodiments will be described in detail with reference to the accompanying drawings so that those skilled in the art can easily carry out the disclosure. It should be understood, however, that the various embodiments are not for limiting the scope of the disclosure to the particular disclosed forms, but they should be interpreted to include all modifications, equivalents, and alternatives of the embodiments included within the sprit and technical scope disclosed herein.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

The terms used in the exemplary embodiments are for the purpose of describing specific exemplary embodiments only, and are not intended to limit the scope of the disclosure. The singular forms "a", "an", and "the" are intended to include the plural forms as well unless the context clearly indicates otherwise. In the disclosure, terms such as "comprises," "includes," or have/has" should be construed as designating that there are such features, integers, steps, operations, components, parts and/or a combination thereof, not to exclude the presence or possibility of adding of one or more other features, integers, steps, operations, components, parts and/or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a block diagram for explaining a configuration of a plant system according to an exemplary embodiment.

Referring to FIG. 1, a plant system according to an exemplary embodiment includes a plant 100, a failure detector 200, a failure diagnostic device 300, a failure predictor 400, a resetter 500, and a controller 600.

The plant 100 includes an actuator 110 and a plurality of sensors 130, and a plant dynamics model 120 is applied. In the exemplary embodiment, the plant 100 is described with a power plant as an example, but is not limited thereto and may be applied to all plants.

The failure detector 200 collects a control value for controlling the plant 100 and a measured value obtained by measuring various information generated according to an operation of the plant 100 from the controller 600, and detects abnormal symptoms or failure. The control value includes, for example, operation information such as power generation output and efficiency. The measured value may be a value obtained by measuring the state, temperature, pressure, humidity, and the like of the plant 100. The failure detector 200 outputs a control value, a forecasted value, a measured value, a residual, and an early warning.

The failure diagnostic device 300 diagnoses the abnormal symptoms or failure detected by the failure detector 200. At this time, the failure diagnostic device 300 outputs diagnosis information by diagnosing signal integrity, a failure time point, a failure location, a warning level, and a failure cause. Here, the signal integrity means determining whether the signal, which is the basis of the abnormal symptoms or failure diagnosis, is generated by the abnormality in a sensor or by an actual failure. The failure time point means a time point at which the failure occurs. The failure location means a location at which the failure occurs. The warning level means a level of the failure at which the failure is determined whether it is insignificant or severe. The failure cause means a reason why the failure occurs.

At this time, the failure diagnostic device 300 diagnoses the failure using each of an algorithm-based diagnosing technique and a domain knowledge-based diagnosing (e.g., base knowledge and case-based diagnosing) technique, and performs a final diagnosis by summarizing the results of the two diagnosing techniques.

The failure predictor 400 forecasts failure based on the diagnosis information output from the failure diagnostic device 300, and outputs predictive information representing the forecasted failure. The predictive information includes a predictive level, time point, tendency, and the like of the failure.

The resetter 500 performs a fault-tolerant control of the plant 100 which modifies a portion in which the failure is forecasted according to the predictive information about the failure forecasted by the failure predictor 400 and allows the remainder to be normally operated.

The controller 600 controls the power generation output, efficiency, and the like of the plant 100 to output various control values for operating the plant. For example, when receiving a reset signal for the fault-tolerant control from the resetter 500, the controller 600 does not output a control value for the portion in which the failure is forecasted, receives the reset signal for resetting the portion in which the failure is forecasted from the resetter 500, and resets the corresponding portion according to the received reset signal.

Figure 2:
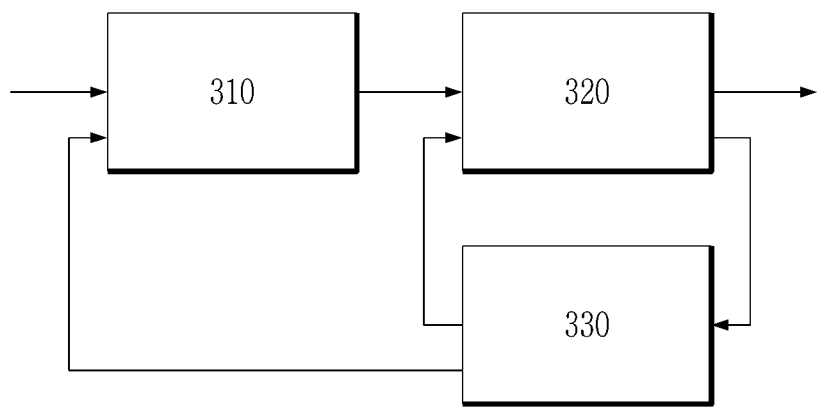
FIG. 2 is a block diagram for explaining a configuration of a failure diagnostic device according to an exemplary embodiment.
Figure 3:
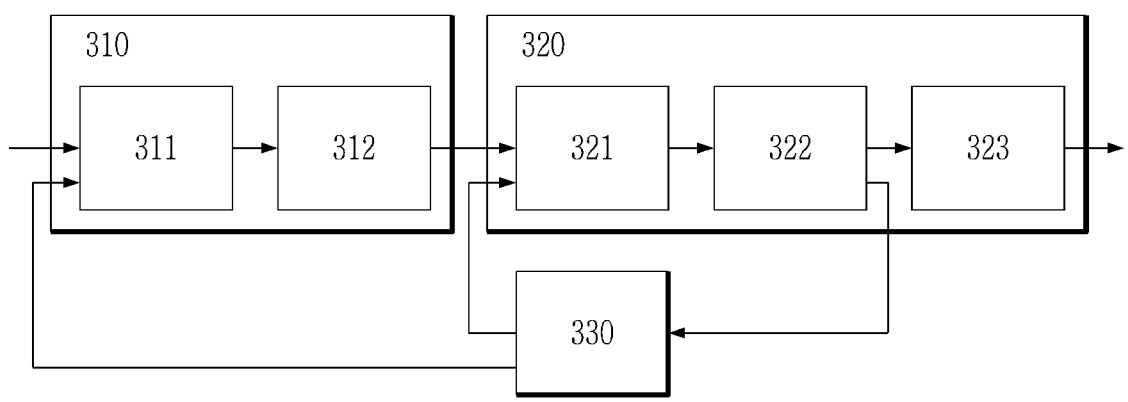
FIG. 3 is a block diagram for explaining a specific configuration of each component of the failure diagnostic device according to an exemplary embodiment.

FIG. 2 is a block diagram for explaining a configuration of the failure diagnostic device according to an exemplary embodiment. FIG. 3 is a block diagram for explaining a specific configuration of each component of the failure diagnostic device according to an exemplary embodiment. Referring to FIGS. 2 and 3, the failure diagnostic device 300 includes a data analyzer 310, a comprehensive diagnostic device 320, and a diagnosis analyzer 330.

The data analyzer 310 generates data analysis information which is information requiring analysis in order to diagnose the failure of the plant, and provides the generated data analysis information to the comprehensive diagnostic device 320. To this end, the data analyzer 310 first collects basic data which are the basis of the data analysis information from the failure detector 200 and the diagnosis analyzer 330. That is, the data analyzer 310 continuously receives and stores, from the failure detector 200, the control value for the plant 100, the forecasted value obtained by forecasting the output of the plant 100 by the control value for the plant 100, the measured value obtained by measuring the output of the plant 100 operated by the control value for the plant 100, the residual which is the difference between the measured value and the forecasted value, and the early warning for the failure of the plant. Further, the data analyzing unit 310 continuously receives and stores the diagnostic analysis information which is fed back from the diagnosis analyzing unit 330. Then, the data analyzer 310 generates the data analysis information by analyzing the basic data. That is, the data analyzer 310 generates the data analysis information including trend information representing trends and change amounts of the control value, the measured value, the forecasted value, and the residual from the control value, the measured value, the forecasted value, the residual, the early warning, and the diagnostic analysis information continuously received, early warning analysis information representing whether the early warning occurs, a time point, a frequency, a location, and a warning level (e.g., low, medium, high), and correlation analysis information which analyzes the correlation between the early warning and the diagnosis. Then, the data analyzer 310 provides the data analysis information to the comprehensive diagnostic device 320.

The data analyzer 310 includes a data generator 311 and an information analyzer 312.

The data generator 311 collects the basic data which are the basis of the data analysis information from the failure detector 200 and the diagnosis analyzer 330. For example, the data generator 311 continuously collects and stores, from the failure detector 200, the control value for the plant 100, the forecasted value obtained by forecasting the output of the plant 100 by the control value for the plant 100, the measured value obtained by measuring the output of the plant 100 operated by the control value for the plant 100, and the residual which is the difference between the measured value and the forecasted value. Further, the data generator 311 continuously collects and stores the generated time and location of the early warning every time the failure detector 200 generates the early warning. Further, the data generator 311 continuously collects and stores the diagnostic analysis information which is fed back from the diagnosis analyzer 330.

The information analyzer 312 generates data analysis information by analyzing the basic data collected by the data generator 311. The data analysis information includes trend information, early warning analysis information, and correlation analysis information. That is, the information analyzer 312 may generate the trend information representing the trends and change amounts of the control value, the measured value, the forecasted value, and the residual from the control value, the measured value, the forecasted value, the residual, the early warning, and the diagnostic analysis information collected by the data generator 311. Further, the information analyzer 312 may generate the early warning analysis information representing whether the early warning occurs, the time point, the frequency, the location, and the warning level (e.g., low, medium, high), and the correlation analysis information which analyzes the correlation between the early warning and the diagnosis from the generated time and location of the early warning, and the diagnostic analysis information collected by the data generator 311. As described above, the information analyzer 312 generates the data analysis information including the trend information, the early warning analysis information, and the correlation analysis information, and provides the generated data analysis information to the comprehensive diagnostic device 320.

The comprehensive diagnostic device 320 diagnoses failure using each of the algorithm-based diagnosing technique and the domain knowledge-based diagnosing (e.g., base knowledge and case-based diagnosing) technique based on the data analysis information, and derives comprehensive diagnosis information for the failure by summarizing the results of the two diagnosing techniques. To this end, the comprehensive diagnostic device 320 includes an algorithm-based diagnostic device 321, a domain knowledge-based diagnostic device 322, and a diagnosis determiner 323.

The algorithm-based diagnostic device 321 performs the diagnosis using the algorithm-based diagnosing technique based on the data analysis information, and as a result, derives algorithm-based diagnosis information. Here, the algorithm-based diagnosing technique inputs the data analysis information to a diagnosing algorithm, and as a result, derives the algorithm-based diagnosis information.

Meanwhile, the algorithm-based diagnostic device 321 may receive, as feedback, algorithm improvement information including a tuning value of the parameter of the diagnosing algorithm from the diagnosis analyzer 330. As described above, when receiving, as feedback, the algorithm improvement information including the tuning value of the parameter of the diagnosing algorithm from the diagnosis analyzer 330, the algorithm-based diagnostic device 321 tunes the parameter of the diagnosing algorithm, and derives the algorithm-based diagnosis information through the tuned diagnosing algorithm.

The domain knowledge-based diagnostic device 322 performs the diagnosis using the domain knowledge-based diagnosing technique based on the data analysis information, and as a result, derives domain knowledge-based diagnosis information. The domain knowledge-based diagnosing technique performs the diagnosis by determining whether the data analysis information is matched with one of a plurality of base knowledge and a plurality of cases. Therefore, if the data analysis information is matched with one of the plurality of base knowledge and the plurality of cases, the domain knowledge-based diagnostic device 322 derives the domain knowledge-based diagnosis information.

Meanwhile, the domain knowledge-based diagnostic device 322 has a determination reference parameter for determining whether the data analysis information is matched with one of the plurality of base knowledge and the plurality of cases. Here, the domain knowledge-based diagnostic device 322 may receive, as feedback, the algorithm improvement information including the tuning value of the base knowledge and case determination reference parameter from the diagnosis analyzer 330. As described above, when receiving, as feedback, the algorithm improvement information including the tuning value of the base knowledge and case determination reference parameter, the domain knowledge-based diagnostic device 322 tunes the base knowledge and case determination reference parameter with the tuning value thereof, and determines whether the data analysis information is matched with one of the plurality of base knowledge and the plurality of cases according to the tuned determination reference parameter to derive the domain knowledge-based diagnosis information.

The algorithm-based diagnosis information and the domain knowledge-based diagnosis information are provided to the diagnosis analyzer 330 and the diagnosis determiner 323. Each of the algorithm-based diagnosis information and the domain knowledge-based diagnosis information includes signal integrity representing whether the failure occurs due to the abnormality of the sensor or the actual failure, a failure time point representing the time point at which the failure occurs, a failure location representing a location at which the failure occurs, a warning level representing the level of the failure, and a failure cause representing the reason why the failure occurs.

The diagnosis determiner 323 derives the comprehensive diagnosis information by summarizing the algorithm-based diagnosis information derived by the algorithm-based diagnostic device 321 and the domain knowledge-based diagnosis information derived by the domain knowledge-based diagnostic device 322. The comprehensive diagnosis information includes the signal integrity representing whether the failure occurs due to the abnormality of the sensor or the actual failure, the failure time point representing the time point at which the failure occurs, the failure location representing a location at which the failure occurs, the warning level representing the level of the failure, and the failure cause representing the reason why the failure occurs.

When receiving the algorithm-based diagnosis information from the algorithm-based diagnostic device 321 and the domain knowledge-based diagnosis information from the domain knowledge-based diagnostic device 322, the diagnosis analyzer 330 generates the algorithm improvement information by analyzing the algorithm-based diagnosis information and the domain knowledge-based diagnosis information, and feedbacks the generated algorithm improvement information to the comprehensive diagnostic device 320. The algorithm improvement information includes the tuning value of the parameter of the diagnosing algorithm for improving the diagnosing algorithm of the algorithm-based diagnostic device 321, and the tuning value of the base knowledge and case determination reference parameter for improving the base knowledge and case determination reference of the domain knowledge-based diagnostic device 322.

Further, the diagnosis analyzer 330 feedbacks the diagnostic analysis information including the algorithm-based diagnosis information, the domain knowledge-based diagnosis information, and the algorithm improvement information to the data analyzer 310.

Figure 4:
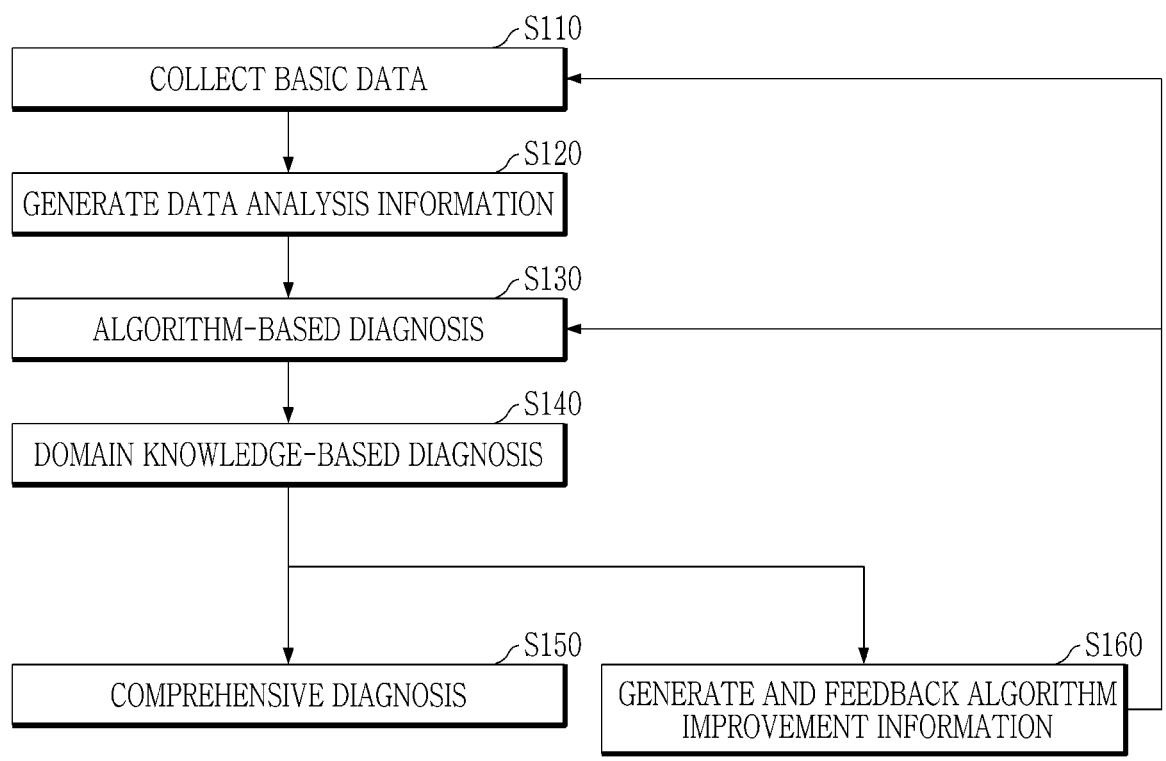
FIG. 4 is a flowchart for explaining a method for diagnosing failure of a plant according to an exemplary embodiment.

FIG. 4 is a flowchart for explaining a method for diagnosing failure of the plant according to an exemplary embodiment.

Referring to FIG. 4, the data generator 311 of the data analyzer 310 collects the basic data, which are the basis of the data analysis information to diagnose the failure of the plant 100, from the failure detector 200 and the diagnosis analyzer 330 (in operation S110). For example, the data generator 311 continuously collects and stores, from the failure detector 200, the control value for the plant 100, the forecasted value obtained by forecasting the output of the plant 100 by the control value for the plant 100, the measured value obtained by measuring the output of the plant 100 operated by the control value for the plant 100, and the residual which is the difference between the measured value and the forecasted value. Further, the data generator 311 continuously collects and stores the generated time and location of the early warning every time the failure detector 200 generates the early warning. Further, the data generator 311 continuously collects and stores the diagnostic analysis information which is fed back from the diagnosis analyzer 330.

The information analyzer 312 of the data analyzer 310 generates the data analysis information by analyzing the basic data collected by the data generator 311 (in operation S120). That is, the information analyzer 312 may generate the trend information representing the trends and change amounts of the control value, the measured value, the forecasted value, and the residual from the control value, the measured value, the forecasted value, the residual, the early warning, and the diagnostic analysis information collected by the data generator 311. Further, the information analyzer 312 may generate the early warning analysis information representing whether the early warning occurs, the time point, the frequency, the location, and the warning level (e.g., low, medium, high), and the correlation analysis information which analyzes the correlation between the early warning and the diagnosis from the generated time and location of the early warning, and the diagnostic analysis information collected by the data generator 311.

The algorithm-based diagnostic device 321 of the comprehensive diagnostic device 320 performs the diagnosis using the algorithm-based diagnosing technique based on the data analysis information, and as a result, derives the algorithm-based diagnosis information (in operation S130). That is, the algorithm-based diagnostic device 321 inputs the data analysis information to the diagnosing algorithm, and as a result, derives the algorithm-based diagnosis information. Meanwhile, in operation S130, when receiving, as feedback, the algorithm improvement information including the tuning value of the parameter of the diagnosing algorithm from the diagnosis analyzer 330, the algorithm-based diagnostic device 321 tunes the parameter of the diagnosing algorithm through the tuning value, and derives the algorithm-based diagnosis information through the tuned diagnosing algorithm.

The domain knowledge-based diagnostic device 322 of the comprehensive diagnostic device 320 performs the diagnosis using the domain knowledge-based diagnosing technique based on the data analysis information, and as a result, derives the domain knowledge-based diagnosis information (in operation S140). That is, if the data analysis information is matched with one of the plurality of base knowledge and the plurality of cases according to the determination reference parameter of the plurality of base knowledge and the plurality of cases, the domain knowledge-based diagnostic device 322 derives the domain knowledge-based diagnosis information.

Meanwhile, in operation S140, when receiving, as feedback, the algorithm improvement information including the tuning value of the base knowledge and case determination reference parameter from the diagnosis analyzer 330, the domain knowledge-based diagnostic device 322 tunes the base knowledge and case determination reference parameter with the tuning value, and determines whether the data analysis information is matched with one of the plurality of base knowledge and the plurality of cases according to the tuned determination reference parameter to derive the domain knowledge-based diagnosis information.

The algorithm-based diagnosis information and domain knowledge-based diagnosis information are provided to the diagnosis analyzer 330 and the diagnosis determiner 323. Further, each of the algorithm-based diagnosis information and the domain knowledge-based diagnosis information includes the signal integrity representing whether the failure occurs due to the abnormality of the sensor or the actual failure, the failure time point representing the time point at which the failure occurs, the failure location representing the location at which the failure occurs, the warning level representing the level of the failure, and the failure cause representing the reason why the failure occurs.

The diagnosis determiner 323 of the comprehensive diagnostic device 320 derives the comprehensive diagnosis information by summarizing the algorithm-based diagnosis information derived from the algorithm-based diagnostic device 321 and the domain knowledge-based diagnosis information derived from the domain knowledge-based diagnostic device 322 (in operation S150). The comprehensive diagnosis information includes the signal integrity representing whether the failure occurs due to the abnormality of the sensor or the actual failure, the failure time point representing the time point at which the failure occurs, the failure location representing the location at which the failure occurs, the warning level representing the level of the failure, and the failure cause representing the reason why the failure occurs.

When receiving the algorithm-based diagnosis information and the domain knowledge-based diagnosis information, the diagnosis analyzer 330 generates the algorithm improvement information by analyzing the algorithm-based diagnosis information and the domain knowledge-based diagnosis information, and feedbacks the generated algorithm improvement information to the comprehensive diagnostic device 320 (in operation S160). Further. the diagnosis analyzer 330 feedbacks the diagnostic analysis information including the algorithm-based diagnosis information, the domain knowledge-based diagnosis information, and the algorithm improvement information to the data analyzer 310. Here, the algorithm improvement information includes the tuning value of the parameter of the diagnosing algorithm for improving the diagnosing algorithm of the algorithm-based diagnostic device 321, and the tuning value of the base knowledge and case determination reference parameter for improving the base knowledge and case determination reference of the domain knowledge-based diagnostic device 322.

Figure 5:
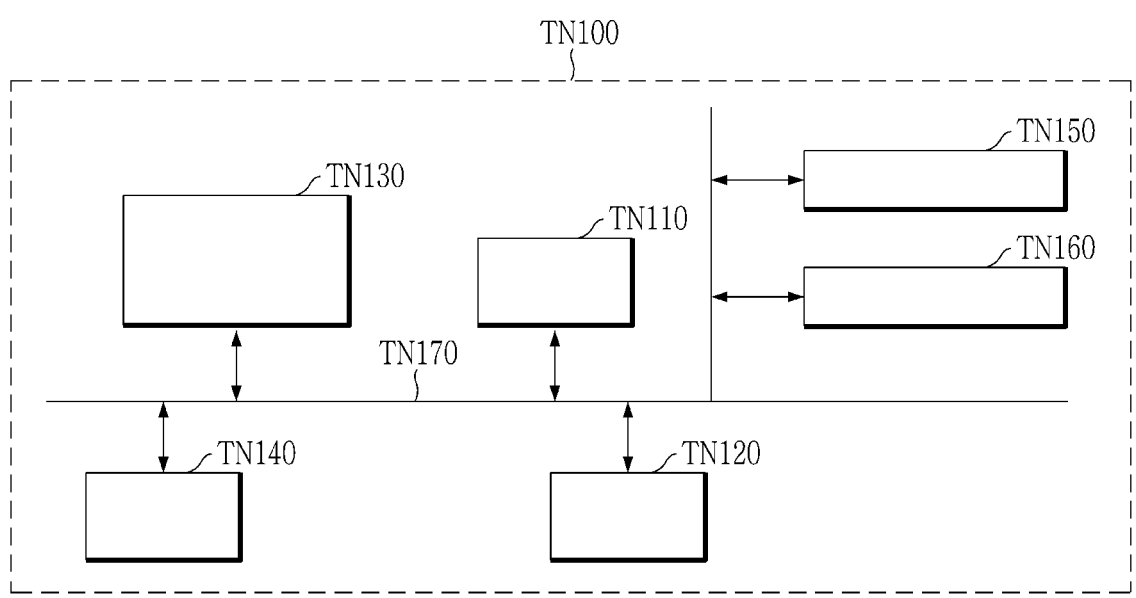
FIG. 5 is a diagram illustrating a computing apparatus according to an exemplary embodiment.

FIG. 5 is a diagram illustrating a computing apparatus according to an exemplary embodiment. A computing apparatus TN100 may be the apparatus described in the present specification (e.g., apparatus for diagnosing the failure of the plant or the like).

Referring to FIG. 5, the computing apparatus TN100 may include at least one processor TN110, a transceiver TN120, a memory TN130. The computing apparatus TN100 may further include a storage TN140, an input interface TN150, an output interface TN160. The components included in the computing apparatus TN100 may be connected by a bus TN170 and communicate with each other.

The processor TN110 may execute a program command stored in at least one of the memory TN130 and the storage TN140. The processor TN110 may include a central processing unit (CPU), a graphics processing unit (GPU), or a dedicated processor in which the methods according to the exemplary embodiment are performed. The processor TN110 may be configured to implement the procedure, function, method, and the like described with regard to the exemplary embodiment. The processor TN110 may control each component of the computing apparatus TN100.

Each of the memory TN130 and the storage TN140 may store various information related to an operation of the processor TN110. Each of the memory TN130 and the storage TN140 may be composed of at least one of a volatile storage medium and a non-volatile storage medium. For example, the memory TN130 may be composed of at least one of a read only memory (ROM) and a random access memory (RAM).

The transceiver TN120 may transmit and/or receive a wired signal or a wireless signal. The transceiver TN120 may be connected to a network to perform communication.

Meanwhile, various methods according to the exemplary embodiment described above may be implemented in the form of a readable program through various computer means and recorded in a computer readable recording medium. Here, the recording medium may include program commands, data files, data structures, and the like alone or in combination thereof. The program commands recorded in the recording medium may be those specially designed and configured for the exemplary embodiment or may also be those known and available to those skilled in the art of computer software. For example, the recording medium includes a hardware device specially configured to store and execute the program commands such as magnetic media such as a hard disk, a floppy disk, and a magnetic tape, optical media such as a CD-ROM and a DVD, magneto-optical media such as a floptical disk, a ROM, a RAM, or a flash memory. Examples of the program command may include a high-level language which may be executed by a computer using an interpreter or the like as well as a machine language wire as produced by a compiler. The hardware device may be configured to operate as one or more software modules in order to perform the operation of the exemplary embodiment, and vice versa.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. An apparatus for diagnosing failure of a plant comprising:
a failure detecting circuitry configured to provide basic abnormal symptom information including a forecasted value, a measured value, a residual which is a difference between the measured value and the forecasted value, and an early warning;
a data analysis circuitry configured to receive the basic abnormal symptom information from the failure detecting circuitry and generate and provide data analysis information, which is information requiring analysis to diagnose failure of the plant based on the basic abnormal symptom information;
a comprehensive diagnostic circuitry configured to diagnose the failure using each of an algorithm-based diagnosing technique and a domain knowledge-based diagnosing technique based on the data analysis information, and to derive comprehensive diagnosis information for the failure by summarizing both algorithm-based diagnosis information resulted-in from the algorithm-based diagnosing technique and domain knowledge-based diagnosis information resulted-in from the domain knowledge-based diagnosing technique; and
a diagnosis analysis circuitry configured to generate algorithm improvement information by analyzing both the algorithm-based diagnosis information and the domain knowledge-based diagnosis information, and to feedback the algorithm improvement information to the comprehensive diagnostic circuitry and feedback diagnostic analysis information including the algorithm-based diagnosis information, the domain knowledge-based diagnosis information and the algorithm improvement information to the data analysis circuitry,
wherein the algorithm-based diagnosing technique is performed by inputting the data analysis information to a diagnosing algorithm and as a result, deriving the algorithm-based diagnosis information, and
wherein the domain knowledge-based diagnosing technique, as opposed to the algorithm-based diagnosing technique, is performed by determining whether the data analysis information is matched with one of a plurality of base knowledge and a plurality of cases, wherein the data analysis circuitry is further configured to continuously receive the fed-back diagnostic analysis information from the diagnosis analysis circuitry and generate the data analysis information including correlation analysis information which analyzes a correlation between the early warning and the fed-back diagnostic analysis information based on the basic abnormal symptom information and the fed-back diagnostic analysis information, the correlation analysis information being provided to the comprehensive diagnostic circuitry.

2. The apparatus for diagnosing the failure of the plant of claim 1, wherein the comprehensive diagnostic circuitry comprises:
    an algorithm-based diagnostic circuitry configured to derive algorithm-based diagnosis information by performing the diagnosis using the algorithm-based diagnosing technique based on the data analysis information; and
    a domain knowledge-based diagnostic circuitry configured to derive domain knowledge-based diagnosis information by performing the diagnosis using the domain knowledge-based diagnosing technique based on the data analysis information.

3. The apparatus for diagnosing the failure of the plant of claim 2, wherein the comprehensive diagnostic circuitry further comprises:
    a diagnosis determining circuitry configured to derive the comprehensive diagnosis information by summarizing the algorithm-based diagnosis information derived from the algorithm-based diagnostic circuitry and the domain knowledge-based diagnosis information derived from the domain knowledge-based diagnostic circuitry.

4. The apparatus for diagnosing the failure of the plant of claim 1, wherein the algorithm improvement information comprises:
    a tuning value of a parameter of the algorithm-based diagnosing technique for improving the algorithm-based diagnosing technique of the algorithm-based diagnostic circuitry; and
    a tuning value of a base knowledge and case determination reference parameter for improving a base knowledge and case determination reference of the domain knowledge-based diagnostic circuitry.

5. The apparatus for diagnosing the failure of the plant of claim 4, wherein in response to receiving, as feedback, the algorithm improvement information comprising the tuning value of the parameter of the diagnosing algorithm from the diagnosis analysis circuitry, the algorithm-based diagnostic circuitry tunes the parameter of the diagnosing algorithm, and derives the algorithm-based diagnosis information through the tuned diagnosing algorithm.

6. The apparatus for diagnosing the failure of the plant of claim 4, wherein in response to receiving, as feedback, the algorithm improvement information comprising the tuning value of the base knowledge and case determination reference parameter from the diagnosis analysis circuitry, the domain knowledge-based diagnostic circuitry tunes the base knowledge and the case determination reference parameter, and determines whether the data analysis information is matched with one of the plurality of base knowledge and the plurality of cases according to the tuned determination reference parameter to derive the domain knowledge-based diagnosis information.

7. The apparatus for diagnosing the failure of the plant of claim 1, wherein the data analysis circuitry further comprises:
    a data generating circuitry configured to collect the basic abnormal symptom information which are basis of the data analysis information; and
    an information analysis circuitry configured to analyze the basic abnormal symptom information to generate the data analysis information.

8. The apparatus for diagnosing the failure of the plant of claim 7, wherein the data analysis information comprises:
    trend information representing trends and change amounts of a control value for the plant, a forecasted value obtained by forecasting the output of the plant by the control value for the plant, a measured value obtained by measuring the output of the plant operated by the control value for the plant and a residual which is a difference between the measured value and the forecasted value; and
    early warning analysis information representing whether an early warning occurs, a time point, a frequency, a location, and a warning level for the failure of the plant.

9. The apparatus for diagnosing the failure of the plant of claim 1, wherein the comprehensive diagnosis information comprises:
    signal integrity representing whether the failure occurs due to an abnormality of a sensor or an actual failure,
    a failure time point representing a time point at which the failure occurs,
    a failure location representing a location at which the failure occurs,
    a warning level representing a level of the failure, and
    a failure cause representing a reason why the failure occurs, and
    wherein the comprehensive diagnostic circuitry is configured to generate the comprehensive diagnosis information by summarizing the algorithm-based diagnosis information and the domain knowledge-based diagnosis information.

10. The apparatus for diagnosing failure of a plant of claim 1, further comprising:
    a controlling circuitry configured to control operation of the plant;
    a failure predicting circuitry configured to forecast failure based on the comprehensive diagnosis information provided from the comprehensive diagnostic circuitry and provide predictive information representing the forecasted failure of a portion of the plant including a predictive level, time point, and tendency of the failure; and
    a resetting circuitry configured to perform, based on the predictive information from the failure predicting circuitry, a fault-tolerant control of the plant which modifies the failure-forecasted portion of the plant and allows a remainder, which is not the failure-forecasted portion, to be normally operated and provide a reset signal for the fault-tolerant control with respect to the failure-forecasted portion of the plant,
    wherein the controlling circuitry, when receiving the reset signal, does not output a control value for the failure-forecasted portion and resets the failure-forecasted portion according to the received reset signal.

11. A method for diagnosing failure of a plant, the method comprising:
    providing, by a failure detecting circuitry, basic abnormal symptom information including a forecasted value, a measured value, a residual which is a difference between the measured value and the forecasted value, and an early warning;

receiving, by a data analysis circuitry, the basic abnormal symptom information from the failure detecting circuitry;

generating and providing, by the data analysis circuitry, data analysis information which is information requiring analysis to diagnose failure of the plant based on the basic abnormal symptom information;

diagnosing, by a comprehensive diagnostic circuitry, the failure using each of an algorithm-based diagnosing technique and a domain knowledge-based diagnosing technique based on the data analysis information, and deriving comprehensive diagnosis information for the failure by summarizing both algorithm-based diagnosis information resulted-in from the algorithm-based diagnosing technique and domain knowledge-based diagnosis information resulted-in from the domain knowledge-based diagnosing technique; and generating, by a diagnosis analysis circuitry, algorithm improvement information by analyzing both the algorithm-based diagnosis information and the domain knowledge-based diagnosis information, and feedbacking the algorithm improvement information to the comprehensive diagnostic circuitry and the data analysis circuitry and feedbacking diagnostic analysis information including the algorithm-based diagnosis information, the domain knowledge-based diagnosis information and the algorithm improvement information to the data analysis circuitry, wherein the algorithm-based diagnosing technique is performed by inputting the data analysis information to a diagnosing algorithm and as a result, deriving the algorithm-based diagnosis information, and wherein the domain knowledge-based diagnosing technique, as opposed to the algorithm-based diagnosing technique, is performed by determining whether the data analysis information is matched with one of a plurality of base knowledge and a plurality of cases, wherein the data analysis circuitry is further configured to continuously receive the fed-back diagnostic analysis information from the diagnosis analysis circuitry and generate the data analysis information including correlation analysis information which analyzes a correlation between the early warning and the fed-back diagnostic analysis information based on the basic abnormal symptom information and the fed-back diagnostic analysis information, the correlation analysis information being provided to the comprehensive diagnostic circuitry.

12. The method of claim 11, wherein the deriving of the comprehensive diagnosis information comprises:

deriving, by an algorithm-based diagnostic circuitry of the comprehensive diagnostic circuitry, algorithm-based diagnosis information by performing diagnosis using the algorithm-based diagnosing technique based on the data analysis information; and deriving, by a domain knowledge-based diagnostic circuitry of the comprehensive diagnostic circuitry, domain knowledge-based diagnosis information by performing the diagnosis using the domain knowledge-based diagnosing technique based on the data analysis information.

13. The method of claim 12, wherein in response to receiving, as feedback, the algorithm improvement information comprising a tuning value of a parameter of the algorithm-based diagnosing technique from the diagnosis analysis circuitry, the deriving of the algorithm-based diagnosis information comprises tuning the parameter of the algorithm-based diagnosing technique, and deriving the algorithm-based diagnosis information through the tuned diagnosing algorithm, by the algorithm-based diagnostic circuitry.

14. The method of claim 12, wherein in response to receiving, as feedback, the algorithm improvement information comprising a tuning value of a base knowledge and case determination reference parameter from the diagnosis analysis circuitry, the deriving of the algorithm-based diagnosis information comprises tuning the base knowledge and the case determination reference parameter, and determining whether the data analysis information is matched with one of the plurality of base knowledge and the plurality of cases according to the tuned determination reference parameter to derive the domain knowledge-based diagnosis information by the domain knowledge-based diagnostic circuitry.

15. The method of claim 12, wherein the deriving of the comprehensive diagnosis information further comprises:

deriving, by a diagnosis determining circuitry of the comprehensive diagnostic circuitry, the comprehensive diagnosis information for the failure by summarizing the algorithm-based diagnosis information derived from the algorithm-based diagnostic circuitry and the domain knowledge-based diagnosis information derived from the domain knowledge-based diagnostic circuitry.

16. The method of claim 15, wherein the comprehensive diagnosis information comprises:

signal integrity representing whether the failure occurs due to an abnormality of a sensor or an actual failure, a failure time point representing a time point at which the failure occurs, a failure location representing a location at which the failure occurs, a warning level representing a level of the failure, and a failure cause representing a reason why the failure occurs.

17. The method of claim 12, wherein the algorithm improvement information comprises:

a tuning value of a parameter of a diagnosing algorithm for improving the diagnosing algorithm of the algorithm-based diagnostic circuitry; and a tuning value of a base knowledge and case determination reference parameter for improving a base knowledge and case determination reference of the domain knowledge-based diagnostic circuitry.

18. The method of claim 11, wherein the providing of the data analysis information comprises:

collecting, by a data generating circuitry of the data analysis circuitry, the basic abnormal symptom information which are basis of the data analysis information; and generating, by an information analysis circuitry of the data analysis circuitry, the data analysis information by analyzing the basic abnormal symptom information.

19. The method of claim 11, wherein the data analysis information comprises:

trend information representing trends and change amounts of a control value for the plant, a forecasted value obtained by forecasting the output of the plant by the control value for the plant, a measured value obtained by measuring the output of the plant operated by the control value for the plant, and a residual which is a difference between the measured value and the forecasted value; and early warning analysis information representing whether an early warning occurs, a time point, a frequency, a location, and a warning level for the failure of the plant.

* * * * *